May 24, 1932.  B. CASTIGLIA  1,860,233
DIRIGIBLE HEADLIGHT FOR MOTOR VEHICLES
Filed Dec. 11, 1930  2 Sheets-Sheet 1
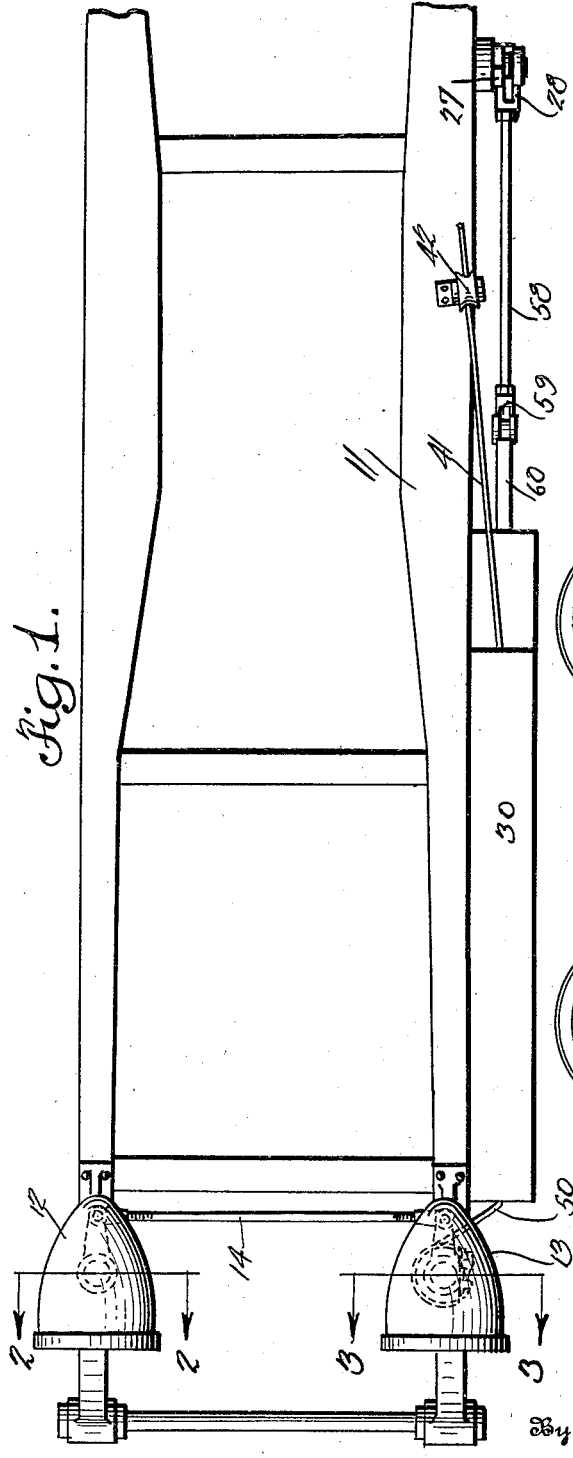
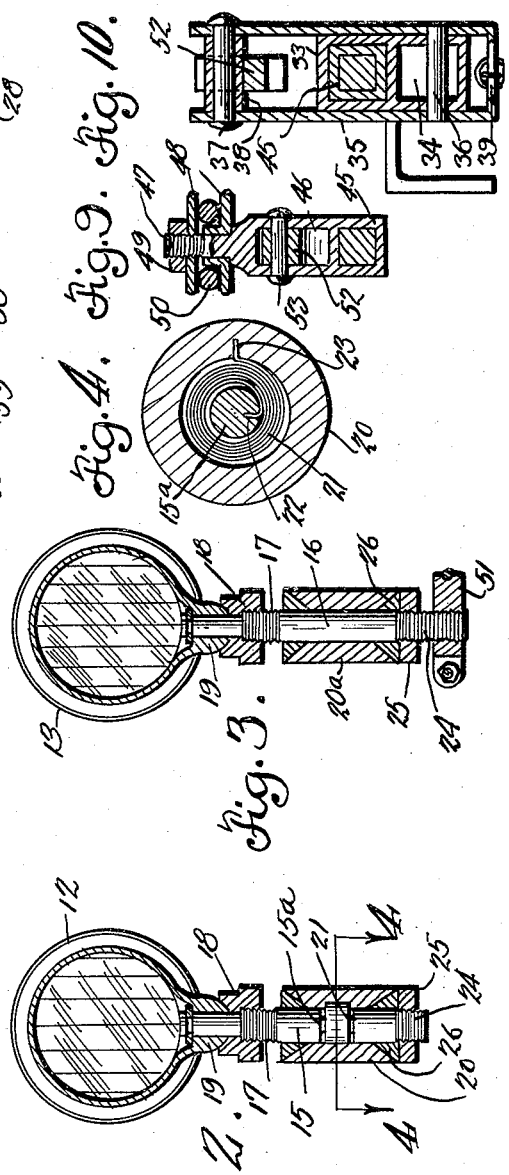
Inventor
Biagio Castiglia.
By
Bryant & Lowry
Attorneys

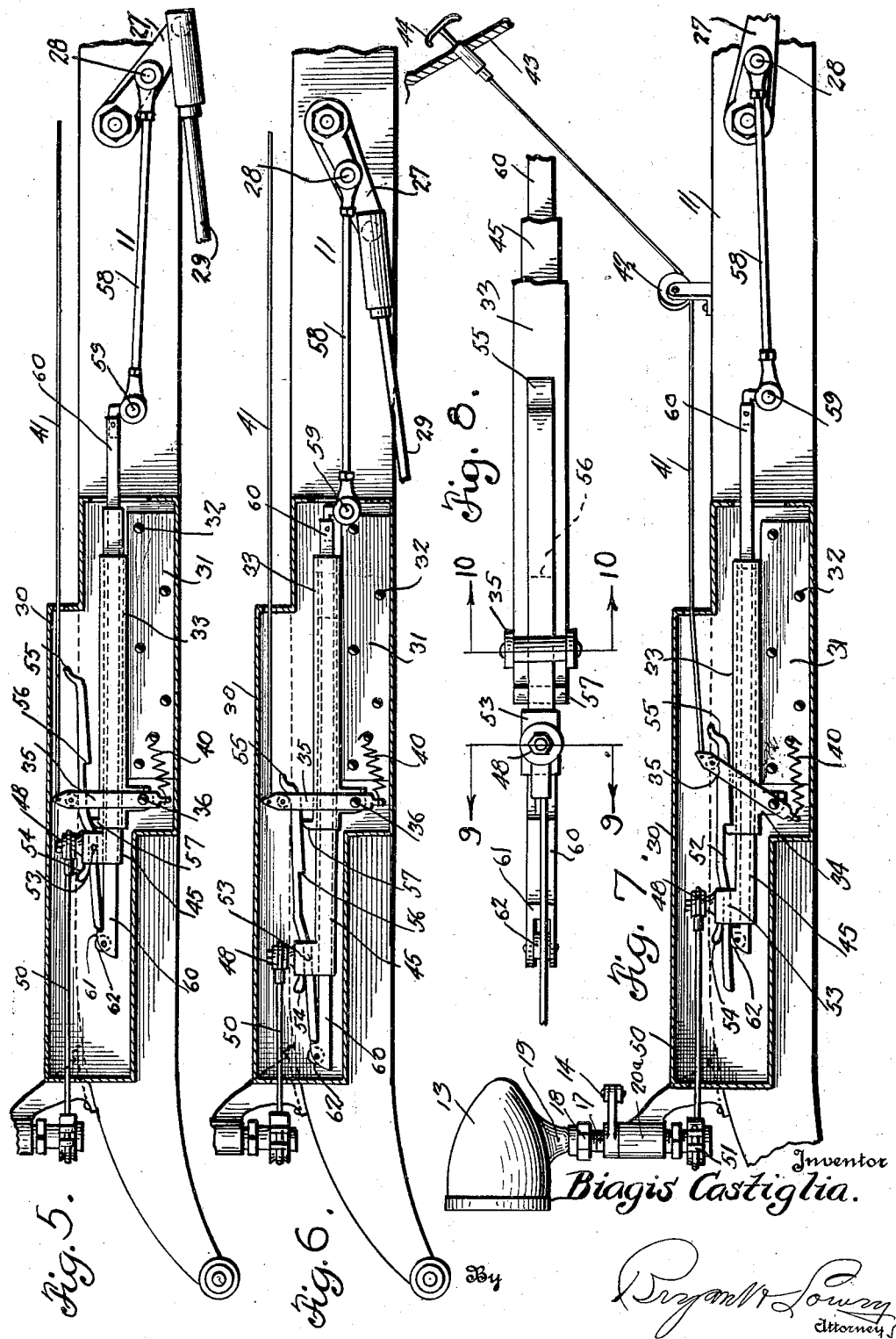

Patented May 24, 1932

1,860,233

UNITED STATES PATENT OFFICE

BIAGIS CASTIGLIA, OF BRONX, NEW YORK

DIRIGIBLE HEADLIGHT FOR MOTOR VEHICLES

Application filed December 11, 1930. Serial No. 501,632.

This invention relates to certain new and useful improvements in dirigible headlights for motor vehicles.

The primary object of the invention is to provide a dirigible headlight for motor vehicles, the operating mechanism of which is associated with the motor vehicle steering devices so that upon operation of the steering mechanism for changing the direction of the vehicle to either the right or the left, the headlights will be correspondingly shifted to cause light rays from the headlights to be directed forwardly of the vehicle and in its exact path of travel.

Another and important object of the invention, is to provide dirigible headlight mechanism of the foregoing type wherein the operating mechanism for laterally shifting the headlights may be disconnected from the steering mechanism whereby the headlights remain stationary and unresponsive to movements of the steering mechanism, the mechanisms being connected or disconnected by a pull cord or rod having an operating handle in proximity of the driver of the vehicle.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary top plan view of a motor vehicle chassis equipped with pivotally mounted and connected headlights and the encased mechanism for connecting and disconnecting the steering devices to the headlights;

Figure 2 is a vertical sectional view taken on line 2—2 of Figure 1 showing a rotatably tensioned headlight spindle;

Figure 3 is a vertical sectional view taken on line 3—3 of Figure 1 showing the connection between the other headlight and steering mechanism:

Figure 4 is a cross-sectional view taken on line 4—4 of Figure 2 showing the spring device for rotatably tensioning one of the headlights;

Figure 5 is a fragmentary side elevational view with the mechanism casing shown in section and illustrating the devices for connecting the headlights to the steering mechanism;

Figure 6 is a fragmentary side elevational view, similar to Figure 5, showing the steering mechanism and connecting devices in another position;

Figure 7 is a fragmentary side elevational view, similar to Figures 5 and 6 showing the connecting devices disconnected from the steering mechanism and the pull cord or wire for affecting the disconnection;

Figure 8 is a fragmentary top plan view of the devices for connecting the headlights to the steering mechanism;

Figure 9 is a cross-sectional view taken on line 9—9 of Figure 8; and

Figure 10 is a cross-sectional view taken on line 10—10 of Figure 8.

Referring more in detail to the accompanying drawings, the reference numeral 11 indicates part of a motor vehicle chassis equipped with headlights 12 and 13 mounted upon journalled spindles and connected by a cross rod 14 to cause the lamps to move in unison when connected to the steering mechanism of the motor vehicle for movement either to the left or right to follow the direction of the vehicle and cast the light rays directly forwardly thereof. The headlights 12 and 13 are mounted upon journalled spindles 15 and 16 respectively, each spindle having a threaded portion 17 adjacent its upper end with which a socketed nut 18 is engaged for association with the base lug 19 depending from each lamp and permitting angular or vertical adjustments of the headlights 12 and 13 whereby the light rays may be projected at the desired elevation.

The spindle 15 for the headlight 12 is mounted in the bearing sleeve 20 shown in detail in Figure 4, a portion of the spindle 15 within the sleeve 20 being angularly reduced as at 15a and surrounded by a coil spring 21, one end of the spring being anchored as at 22 to the spindle part 15a while the other end of the spring is anchored as at 23 to the sleeve 20 for tensioning the spindle 15 in one direction of rotary movement. A similar bearing sleeve 20a is provided for the headlight spindle 16 and the lower ends of the two spindles 15 and 16 are threaded as at 24 to receive jamb nuts 25 engaged with adjacent cone fillers 26 within the tapered ends of the sleeves for retaining the parts assembled.

A part of the motor vehicle steering mechanism herein illustrated includes the arm 27 pivotally mounted upon the chassis 11 and pivotally connected at its other end as at 28 to the link 29 extending forwardly for connection with the steering knuckles of the vehicle wheels, these parts being fragmentarily illustrated in Figure 5. The devices for connecting the headlights 12 and 13 to the pivoted arm 27 of the steering mechanism are shown more clearly in Figures 5 to 10 and are enclosed within the casing 30 secured to a side of the chassis 11 as shown in Figure 1, the devices including a bracket plate 31 anchored as at 32 to the chassis and carrying at its upper end a tubular guide 33 rectangular in cross-section as shown in Figure 10. A pair of side arms 34 depend from the forward end of the tubular guide 33 and a frame comprising side bars 35 straddles the tubular guide and is pivotally mounted as at 36 upon the depending side arms 34. The upper ends of the side bars 35 are connected by a cross-pin 37 upon which a roller 38 is mounted while the lower ends of the side bars 35 are connected by a cross arm 39 to which one end of a coil spring 40 is attached, the other end of the coil spring being anchored to the bracket plate 31 for tensioning the frame and normally moving the upper ends of the side bars 35 in a forward direction. A pull cord 41 is attached to the upper ends of the side bars 35 and traversing the guide pulley 42 mounted upon the chassis 11 extending through the instrument board 43 of the vehicle or other support adjacent the driver and on such end is provided a handle 44 for manipulating the pull cord to shift the arm 34 against the tension of the spring 40 as shown in Figure 7 for purposes presently to appear.

A tubular sleeve 45 rectangular in cross-section is slidably mounted in the guide 33 and at its forward end carries an upstanding frame 46 terminating in a screw pin 47 receiving spaced washers 48 and a binding nut 49. A cable 50 has one end thereof anchored between the washers 48 and extending through the forward end of the casing 30 is wound upon and secured to a grooved pulley 51 anchored to the lower threaded end 24 of the headlight spindle 16. A latch arm 52 is pivotally mounted as at 53 within the frame 46 with the forward end thereof normally influenced in a downward direction by the leaf spring 54 while the rear end of the latch arm 52 extends rearwardly between the side bars 35 having the rear terminal end thereof upwardly directed as at 55. The lower side of the latch arm 52 rearwardly of the pivot 53 carries a latch lug 56 for cooperation with the upstanding latch lug 57 upon the tubular guide 33.

The link 58 is mounted at one end upon the pivot 28 of the steering arm 27 and is pivotally connected as at 59 at its other end to a slide rod 60 rectangular in cross-section that is mounted in the tubular slide 45, the forward end of the slide rod 60 carrying a latch lug 61 and a roller bearing 62.

When it is desired to have the headlights 12 and 13 remain stationary against movement with the steering mechanism of the motor vehicle, a pull is exerted upon the cord 41 by the handle 44 to shift the side bars 35 against the tension of the spring 40 to cause the roller 38 to engage the rear end of the latch lever 52 for elevating the forward end of the latch lever against the tension of the spring 54, the latch lever 52 in this position having the latch lug 56 thereof engaged with the latch lug 57 upon the stationary guide 33 and as said latch lever is pivotally mounted upon the tubular slide 45, the latter is restrained from forward sliding movement under influence of the spring 21 associated with the headlight 12, the headlights remaining directly forwardly positioned and said steering mechanism may be freely operated, the rod 60 being freely slidable with the roller 62 at the forward end thereof being engaged with the underside of the forward end of the latch lever 52 to reduce friction.

When it is desired to connect the headlights 12 and 13 with the steering mechanism of the motor vehicle, assuming the parts to be in the position shown in Figure 7, the handle 44 associated with the pull cord 41 is pushed forwardly to allow the side bars 35 under influence of the spring 40 to occupy vertical positions shown in Figures 5 and 6. Upon forward movement of the slide rod 60, the spring 54 will depress the forward end of the latch lever 52 into engagement with the latch lug 61 of the slide rod 60 and disengage the latch lugs 56 and 57 upon the latch lever and guide 33 respectively. The tubular guide 45 is then interlockingly engaged with the slide rod 60 by the spring 21 associated with the headlight spindle 14 together with the cable connection 50 between the headlight spindle 16 and the tubular slide 45. Rearward movement of the slide 45 caused by the engagement between the slide rod 60 and latch lever 52 will cause the headlights to move in one direction against the tension of the spring 21 while forward movement of the slide rod 60 permits forward sliding movement of the tubular slide 45 under influence of the spring 21. As previously stated, when the dirigible headlight mechanism is disconnected from the steering mechanism, the latch lever 52 is engaged with the stationary guide 33 for holding the headlights against movement.

While there is herein shown and described the preferred embodiment of the invention, it is nevertheless to be understood that minor changes may be made therein without departing from the spirit of the invention or the scope of the subjoined claims.

I claim:

1. In dirigible headlight mechanism for motor vehicles, a pair of connected headlights carried by journalled spindles, a spring associated with one spindle for turning the headlights in one direction and latch devices interposed between the spring bearing spindle and vehicle steering mechanism for turning the headlights in the opposite direction upon movement of the steering mechanism, the latch devices including a sliding member carrying a pivoted latch arm and a slide rod engageable with the latch arm for locking the headlights to the steering mechanism.

2. In dirigible headlight mechanism for motor vehicles, a pair of connected headlights carried by journalled spindles, a spring associated with one spindle for turning the headlights in one direction and latch devices interposed between the spring bearing spindle and vehicle steering mechanism for turning the headlights in the opposite direction upon movement of the steering mechanism, the latch devices including a sliding member carrying a pivoted latch arm and a slide rod engageable with the latch arm for locking the headlights to the steering mechanism, a fixed abutment lug adjacent the latch arm and means for disengaging the latch arm from the rod and engaging the latch arm with the abutment lug to hold the headlights against movement during operation of the steering mechanism.

3. In dirigible headlight mechanism for motor vehicles, a pair of connected headlights carried by journalled spindles, a spring associated with one spindle for turning the headlights in one direction and latch devices interposed between the spring bearing spindle and vehicle steering mechanism for turning the headlights in the opposite direction upon movement of the steering mechanism, the latch devices including a fixed guide sleeve, a second sleeve slidable therein, a rod slidable in the second sleeve, a latch arm pivoted on the second sleeve and spring pressed into engagement with the rod for locking the headlights to the steering mechanism.

4. In dirigible headlight mechanism for motor vehicles, a pair of connected headlights carried by journalled spindles, a spring associated with one spindle for turning the headlights in one direction and latch devices interposed between the spring bearing spindle and vehicle steering mechanism for turning the headlights in the opposite direction upon movement of the steering mechanism, the latch devices including a fixed guide sleeve, a second sleeve slidable therein, a rod slidable in the second sleeve, a latch arm pivoted on the second sleeve and spring pressed into engagement with the rod for locking the headlights to the steering mechanism, and a pull cord device for disengaging the latch arm from the rod and engaging the same with the fixed guide sleeve whereby the headlights are restrained from movement during operation of the steering mechanism.

5. In dirigible headlight mechanism for motor vehicles, a pair of connected headlights carried by journalled spindles, a spring associated with one spindle for turning the headlights in one direction and latch devices interposed between the spring bearing spindle and vehicle steering mechanism for turning the headlights in the opposite direction upon movement of the steering mechanism, the latch devices including a fixed guide sleeve, a second sleeve slidable therein, a rod slidable in the second sleeve, a latch arm pivoted on the second sleeve and spring pressed into engagement with the rod for locking the headlights to the steering mechanism, and a pull cord device for disengaging the latch arm from the rod and engaging the same with the fixed guide sleeve whereby the headlights are restrained from movement during operation of the steering mechanism, the pull cord device including frame bars pivoted on the fixed guide between which the latch arm passes and a roller on the frame bars engageable with the latch arm for disconnecting the latch arm from the rod.

6. In dirigible headlight mechanism for motor vehicles, a pair of connected headlights carried by journalled spindles, a spring associated with one spindle for turning the headlights in one direction and latch devices interposed between the spring bearing spindle and vehicle steering mechanism for turning the headlights in the opposite direction upon movement of the steering mechanism, the latch devices including a sliding member carrying a pivoted latch arm and a slide rod engageable with the latch arm for locking the headlights to the steering mechanism, and a pull cord operator for the latch devices for permitting movement of the headlights from angular position to straight forward positions to be restrained from further movements by the steering mechanism upon operation of the pull cord.

In testimony whereof I affix my signature.

BIAGIS CASTIGLIA.